United States Patent Office 3,123,585
Patented Mar. 3, 1964

3,123,585
N-CYCLOALKYL OXYANILINES
Bertrand Ernest Wilde, deceased, late of Pentre, Wrexham, Wales, by Marion Ilse Hedwig Bethell, administratrix, Bromborough, England, assignor to Monsanto Chemicals Limited, London, England, a British company
No Drawing. Filed May 23, 1962, Ser. No. 197,201
Claims priority, application Great Britain Feb. 17, 1958
17 Claims. (Cl. 260—45.9)

This invention relates to rubber chemicals that give protection against the action of oxygen and ozone, particularly for instance to compounds which do not seriously discolor rubber stocks in which they are used and which are therefore suitable for use in white and other light-colored compositions.

It is well known that vulcanized rubber is liable to deteriorate on exposure to the action of heat, light and oxygen-containing gases, and that deterioration occurs in the atmosphere under normal conditions of use. To resist this effect various substances have been proposed for use in rubber as antioxidants, but many of these suffer from the disadvantage that they cause darkening with time and badly discolor the rubber stocks in which they are incorporated if these should be of a light color. This problem does not arise with dark-colored stocks obtained using carbon blacks, for instance, but it is a serious difficulty in such compositions as the white rubber stocks obtained using zinc oxide, titanium dioxide, and analogous substances.

Other deterioration which can take place in rubber is that caused by the small quantities of ozone usually present in the atmosphere. The particular effect which ozone has on rubber is that it is largely responsible for the surface cracking which can occur when rubber is subjected to distortion or extension. An ordinary rubber antioxidant does not by any means necessarily give protection against this effect of ozone. A rubber chemical which does combine both functions is conveniently termed an antidegradant.

A completely new class of antidegradants has now been discovered, the members of which are very effective antioxidants. They give a considerable measure of protection to the action of ozone, and they do not seriously discolor light-colored rubber stocks.

The present invention comprises rubber in which there is incorporated as antidegradant a substituted aniline of the formula:

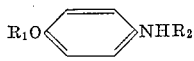

where $R_1$ is an aralkyl group or an alkyl group containing eight or more carbon atoms and $R_2$ is an alicyclic group, and where the benzene ring can contain an inactive substituent, or a salt of one of these substituted anilines.

Substituted anilines of the formula:

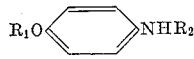

where $R_1$ is an aralkyl group or an alkyl group containing eight or more carbon atoms and $R_2$ is an alicyclic group, and where the benzene ring can contain an inactive substituent, and their salts, are new compounds and are claimed as such.

In general in the substituted anilines of the formula:

when $R_1$ is an alkyl group, it may be either straight or branched-chain; thus $R_1$ can be an octyl group, such as an n-octyl, a 1,3-dimethyl-n-hexyl or 1,5-dimethyl-n-hexyl group; an n-nonyl group; an n-decyl group; an n-dodecyl group; an n-hexadecyl group; or a substantially straight chain alkyl group derived from paraffin wax, such as a hexacosyl group. $R_2$ is preferably cyclohexyl but cyclopentyl or alkyl substituted derivatives thereof are suitable. If $R_1$ is an aralkyl group this can be a benzyl group or an alkyl substituted benzyl group.

Preferably the substituted aniline has at least one position ortho- to the amino group that is vacant, but this is not an essential requirement and in general an inactive substituent or substituents can be present anywhere in the benzene ring. The inactive substituent can for example be a hydrocarbon group, particularly for instance an alkyl group, such as a methyl, ethyl or propyl group.

Salts of the substituted anilines which can be used are the acid-addition salts formed by treating the free base with an acid such as hydrochloric acid, or for instance an organic acid such as acetic or stearic acid. Also suitable are the quaternary ammonium salts, such as the quaternary chlorides obtained by treating the free base with an alkyl chloride.

One process of the invention is for the preparation of the new substituted anilines of formula:

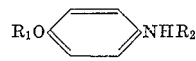

where $R_1$ is an aralkyl group or an alkyl group containing eight or more carbon atoms and $R_2$ is an alicyclic group, where the benzene ring can contain an inactive substituent, by reductive alkylation of an amine:

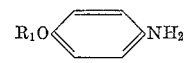

(or a suitable nitrogen-containing precursor such as for instance the nitro compound:

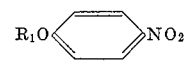

or an azo or hydrazo derivative) in the presence of a ketone from which the group $R_2$ can be derived by reduction.

The second process of the invention is for the preparation of the substituted anilines of formula:

as defined above, by alkylation of the appropriate amine:

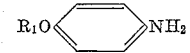

with a halide $R_2X$ where X is a halogen.

In a preferred way of carrying out the first process the appropriate amine:

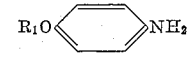

(or a precursor as explained above) and the ketone are subjected to reductive alkylation using hydrogen and a catalyst, for example a catalyst comprising platinum deposited on carbon.

Preferably in carrying out the second process the alkylation is performed in the presence of an acid acceptor, for instance an inorganic alkaline substance such as sodium bicarbonate or sodium carbonate, or an organic base such as an amine. In the latter instance the necessary amine is conveniently provided by employing excess of the amine starting material. The reactants are preferably heated, for instance in the region of 60–120° C.

Excellent results are obtained by use of a halide $R_2X$ where X is bromine; the iodides and chlorides can also be employed in suitable circumstances.

Typical new members of the class of substituted anilines are given below.

| No. | Compound | Boiling Point Pressure | | Melting Point, °C. |
|---|---|---|---|---|
| | | °C. | mm. of Hg | |
| 1 | 4-n-Decyloxy-N-cyclohexyl-aniline. | 225 | 2 | approx. 35.5. |
| 2 | 4-Benzyloxy-N-cyclohexyl-aniline. | 216 | 4 | |

The amount of the substituted aniline used in the rubber can vary between wide limits, but in general it has been found preferable to use from 0.2 to 3 parts by weight and particularly from 0.5 to 2 parts by weight, per hundred parts by weight of rubber used. Amounts somewhat outside these limits can sometimes be employed, for instance from 0.1 to 5 parts of the compound per hundred parts of rubber. Very satisfactory results have been obtained using about 1 part by weight of the substituted aniline per hundred parts by weight of rubber.

The substituted anilines of the invention are effective antioxidants for both natural and synthetic rubbers. Synthetic rubbers which can be used include polymers of 1,3-butadienes, for instance 1,3-butadiene itself, and copolymers of 1,3-butadienes with other monomers, such as styrene, acrylonitrile, isobutylene or methyl methacrylate.

An indication of the non-discoloring properties in rubber of the substituted anilines of the invention was obtained by measuring the light stability of solutions of the compounds in the following way.

A solution of the test compound in pure propylene tetramer (an olefinic material likely to cause discoloration of the type that takes place in rubber) was made up of concentration 0.008 mol. per litre and placed in a loosely corked Pyrex test tube. The test solution was exposed to daylight together with as a control a similarly prepared solution of a commercially available antioxidant known to have excellent non-discoloring properties in rubber, although it possessed no antiozonant activity whatsoever. At intervals of a few days the intensities of the colors developed in the solutions were compared by measuring the light absorption of each one at a wavelength of 4260 A. using an EEL photometer (1 cm. cell; filter 601). Exposure to daylight was continued until the percentage absorption by the control solution (containing the commercial antioxidant) reached 50%. The percentage absorption of the test solution was of course also measured. The value of the substituted aniline as a non-discoloring additive was illustrated by the following result which gives the ratio of the percentage light absorption of the test solution to the percentage light absorption of the control solution after the same exposure.

| Substance | Ratio Test/Control |
|---|---|
| 4-n-Decyloxy-N-cyclohexylaniline | 1.0 |

A value of one does of course signify that the substance tested possesses light stability equal to the additive against which the comparison was made, and which as has been stated was recognized in practice as having excellent non-discoloring properties as an antioxidant in rubber. In fact this result means that the above substituted aniline, which is a valuable antidegradant as is demonstrated later, also possesses excellent non-discoloring properties.

The invention is illustrated by the following examples.

Example 1

This example describes the preparation of 4-n-decyloxy-N-cyclohexylaniline by the reductive alkylation of 4-n-decyloxyaniline with cyclohexanone.

599 grams of 4-n-decyloxyaniline were mixed with 392 grams of cyclohexanone and 2.8 grams of a catalyst composed of carbon on which was supported 5% by weight of platinum. The mixture was then heated with stirring at a temperature which was initially 25° C. and then slowly rose to 100° C. over four hours, in the presence of hydrogen under pressure; the pressure commenced at 400 pounds per square inch and as it fell to 150 during the hydrogenation, as it did several times, more hydrogen was added to raise the pressure again to 400 pounds per square inch. The mixture was cooled and filtered from residual catalyst. The unreacted cyclohexanone was removed from the filtrate by distillation at a pressure of 18 mm. of mercury. The residual crude product was distilled at a pressure of 2 mm. of mercury and a liquid was collected which boiled at 225° C. at this pressure. The distillate thus obtained solidified to a solid of melting point approximately 35.5° C.

Example 2

This example describes the preparation of a 4-branched chain higher alkoxy-N-cyclohexylaniline in which condensation with the ketone and reduction are carried out separately.

100 grams of 4-decyloxyaniline were condensed under vacuum below 100° C. with 250 grams of cyclohexanone until the theoretical amount of water was collected. The excess ketone was stripped off up to 130° C. at 30 mm. and the resulting Schiff's base reduced with hydrogen at 500 pounds per square inch and 130°–150° C. The product was filtered and the solvent removed to yield 88 grams of 4-decyloxy-N-cyclohexylaniline as a yellow oil. Analysis gave 8.6% nitrogen as compared to 8.48% calculated for $C_{22}H_{37}NO$.

Example 3

This example describes the preparation of octyloxy N-cyclohexylanilines.

250 grams of 4-(2-octyloxy)nitrobenzene, 100 ml. of isopropanol and 5 grams of 5% palladium catalyst supported on carbon was charged to an hydrogenator and the nitrocompound reduced with hydrogen at 500 pounds hydrogen per square inch. The temperature was kept below 120° C. during hydrogenation. The reaction mixture was filtered from the catalyst, solvent stripped off and the product distilled. 4-(2-octyloxy)aniline boiled at 172–175° C./6 mm. pressure.

100 grams of 4-(2-octyloxy)aniline so obtained, together with 250 grams of cyclohexanone were charged to a reactor and the intermediate Schiff's base formed by heating under reduced pressure below 100° C. until the theoretical amount of water was collected. The excess cyclohexanone was removed by distillation to pot temperature of about 150° C./10–15 mm. pressure. The residue was charged to an autoclave with 5 grams of 5% palladium supported on carbon and 150 grams of isopropanol and reduced with elemental hydrogen at 500 pounds hydrogen pressure per square inch, keeping the temperature below 150° C. The charge was filtered after hydrogenation, the solvent stripped off and the product vacuum distilled to obtain 120 grams of N-cyclohexyl-4-

(2-octyloxy)aniline, B.P. 220–223° C./5 mm. pressure.

Substituting 100 grams of 4-n-octyloxyaniline, B.P. 175–176° C./3 mm. for the 4-(2-octyloxy)aniline in the foregoing procedure resulted in 104 grams of N-cyclohexyl-4-n-octyloxyaniline, B.P. 230–235° C./5 mm.

2-ethylhexanol was dissolved in pyridine and p-toluene sulfonyl chloride added thereto below 20° C. The reaction mixture was stirred for about an hour, poured into water, benzene added to aid separation and the organic layer separated. A little hydrochloric acid was mixed with the benzene to make sure that all pyridine was removed. The benzene was removed by distillation and the residue reacted with flaked potassium hydroxide and p-nitrophenyl in 300–500 ml. dimethyl formamide, employing a ratio of about 1.1 moles of 2-ethylhexyl toluene sulfonate to 1 mole of p-nitrophenol. The mixture was heated at about 100° C. for 2 hours, poured into water, extracted with benzene and the benzene extract washed with dilute potassium hydroxide solution. The benzene was removed by distillation and 4-(2-ethylhexyloxy)nitrobenzene distilled. It boiled at 175–175° C./2 mm. pressure. This nitrocompound was reduced by elemental hydrogen as previously described to obtain 4-(2-ethylhexyloxy)aniline, B.P. 153–154° C./2 mm. pressure. The latter was condensed with cyclohexanone and reduced as described to obtain 109 grams of N-cyclohexyl-4-(2-ethylhexyloxy)aniline, B.P. 215–217° C./2 mm. pressure.

*Example 4*

This example describes the use of certain of the substituted anilines in a white natural rubber stock, and demonstrates their antioxidant properties.

A white rubber stock of the following composition was compounded on a laboratory mill:

| | Parts by weight |
|---|---|
| Pale crepe rubber | 100 |
| Blanc fixe | 50 |
| Titanium dioxide | 5 |
| Zinc oxide | 5 |
| Stearic acid | 1 |
| Sulfur | 2.5 |
| Diphenylguanidine | 0.5 |

The stock was first made up without any addition, and then with the addition of 1 part by weight of the substituted aniline. The two stocks were respectively termed the control stock and the treated stock.

Each stock was formed into a sheet 4 mm. thick and vulcanized at 141.5° C. for 1 hour. The flat vulcanized sheets (which had retained their white color) were then cut using a rotary cutter into ring-shaped test-pieces having a diameter of 50 mm. and a radial width of 1 mm.

The effect of the substituted aniline as an antioxidant in the samples was determined by the measurement of the stress relaxation half-life at 110° C. This was measured by the method and apparatus described by Robinson and Vodden in "Industrial and Engineering Chemistry" (1955), vol. 47, page 1477. The half-life is the time taken for the stress of the sample, stretched to 100% extension, to diminish to half its value. The effect of an antioxidant is to retard the rate of chain scission in the polymer and thus increase the stress relaxation half-life. The relative activity of the tested antioxidant is then shown by the ratio of the half-lives of the treated and control stocks.

The value of the antioxidant activity of these substituted anilines is shown by the following results:

| Substance | Stress Relaxation, Half-life in Hrs. | | Ratio Treated/ Control |
|---|---|---|---|
| | Control Stock | Treated Stock | |
| 4-n-Decyloxy-N-cyclohexylaniline | 0.89 | 2.60 | 2.92 |
| 4-Benzyloxy-N-cyclohexylaniline | 0.92 | 3.83 | 4.17 |

The above results show a consistently high level of antioxidant activity for the compounds concerned.

In manufacture of rubber goods in which the product comes in contact with lacquered surfaces it is necessary to avoid ingredients which migrate and stain the lacquer during service. The antidegradants of this invention have little tendency to migrate from the rubber into the lacquer surface and are sufficiently non-staining to meet requirements for use in contact with nitrocellulose lacquers. They are significantly superior to the homologous compounds in which a lower alkyl group replaces the higher alkyl or benzyl group attached to the oxygen.

The advantage over lower homologues is strikingly demonstrated by stress relaxation under constant load. In this test, known as measurement of creep, rubber samples are subjected to a stress of 45 pounds per square inch cross sectional area and the time required for the sample to stretch 100% of its original length in air at 100° C. is recorded.

| Antidegradant: | Hours for 100% elongation at 100° C. in air |
|---|---|
| None | 20 |
| 4-ethoxy-N-cyclohexylaniline | 30 |
| 4-branched-decyloxy-N-cyclohexylaniline | 55 |
| 4-n-decyloxy-N-cyclohexylaniline | 63 |
| 4-n-hexyloxy-N-cyclohexylaniline | 54 |

*Example 5*

An Hevea white base stock was compounded comprising:

| | Parts by weight |
|---|---|
| Pale crepe rubber | 100 |
| Titanium dioxide | 50 |
| Zinc oxide | 25 |
| Clay | 15 |
| Stearic acid | 1.0 |
| 2,2'-dithiobis benzothiazole | 0.6 |
| Diphenyl guanidine | 0.15 |
| Sulfur | 3 |

To the base was added 0.0055 mol of antidegradant per 100 parts of rubber and the stocks cured by heating 45 minutes in a press at 144° C. The stocks were artificially aged 96 hours at 100° C. by test tube aging following A.S.T.M. D1206–54T. Other samples of the stocks were aged in an air bomb 6 hours at 121° C. under 80 pounds air pressure per square inch as described in standard procedure A.S.T.M. D454–52. Still other samples were aged 4 days in a bomb at 70° C. under 300 pounds oxygen pressure per square inch following standard procedure A.S.T.M. D572–53. In each case percentage of the original tensile strength retained after aging was determined. Finally, stress relaxation under constant load was determined as described above.

| Antidegradant | Percent Tensile Retained After Aging in— | | | Hours for 100% Elongation at 100° C. in Air |
|---|---|---|---|---|
| | Test Tube | Air Bomb | Oxygen Bomb | |
| 4-n-Amyloxy-N-cyclohexylaniline | 64.8 | 58.9 | 82.7 | 71 |
| 4-n-Octyloxy-N-cyclohexylaniline | 71.2 | 66.5 | 84.8 | 89 |
| 4-n-Decylocy-N-cyclohexylaniline | 77.0 | 70.2 | 93.6 | 94 |

There is need for antidegradants which exhibit antioxidant and antiozonant properties in natural and synthetic rubber without migration staining and discoloration of white rubber formulations. The largest single application for such material would be in the black portion of white sidewall tires. While N-cyclohexyl-p-phenetidine combines antioxidant and antiozonant properties for protection of natural and synthetic rubber with less staining than normally observed with amine antidegradants, N-cyclohexyl-p-alkoxyanilines in which the alkyl radical is a higher alkyl radical containing 8–26 carbon atoms have even less tendency to migrate and stain coupled with significantly greater ability to prevent stress relaxation under constant load.

Secondary tests were carried out in Hevea tread stock comprising:

| | Parts by weight |
|---|---|
| Smoked sheet rubber | 100 |
| Carbon black | 50 |
| Zinc oxide | 5 |
| Saturated hydrocarbon softener | 3 |
| Sulfur | 2.5 |
| N-tert.-butyl-2-benzothiazolesulfenamide | 0.5 |
| Antidegradant | 1.5 |

The stocks were cured by heating in a press in the usual manner for 45 minutes at 144° C. and stress relaxation under constant load at 100° C. determined. The procedure of testing was that described by Throdahl in "Industrial and Engineering Chemistry," 40, 2180 (1948). The rubber samples were subjected to a stress of 45 pounds per square inch cross sectional area and the time required for the sample to stretch 100 percent of its original length recorded. Due to oxidation rubber relaxes and gradually continues to elongate under stress. The rate of elongation of creep is inversely proportionate to antidegradant efficiency. The following results were obtained.

| Antidegradant: | Hours for 100% elongation at 100° C. in air |
|---|---|
| N-cyclohexyl-p-phenetidine | 31 |
| 4-n-hexyloxy-N-cyclohexylaniline | 55 |
| 4-(2-ethyl-n-butoxy)-N-cyclohexylaniline | 55 |
| 4-(2-ethylhexyloxy)-N-cyclohexylaniline | 57 |
| 4-n-octyloxy-N-cyclohexylaniline | 58 |
| 4-n-decyloxy-N-cyclohexylaniline | 62 |

Migration staining of the aforesaid Hevea tread compositions was evaluated. Samples of the compositions were sandwiched to a white rubber formulation containing no antidegradant and the adjoined white and black specimens exposed to the atmosphere white side up toward the sun. One set was exposed after artificially aging for 24 hours at 100° C. in an oven and another set exposed without artificial aging. The light reflected from the surface of the white side of the adjoined black and white rubber samples after 28 days' outdoors exposure was determined by means of a photovolt reflectance meter. The figures recorded below are percent of the incident light reflected. If an antidegradant migrates from the black portion into the white portion of the rubber and discolors it, the percent of incident light reflected is reduced. The degree to which the light reflectance after exposure approaches that for the sample containing no antidegradant in either the black or white formulation is a measure of freedom from discoloration:

| Antidegradant | Percent Light Reflectance after exposure | |
|---|---|---|
| | Unaged | Aged |
| N-Cyclohexyl-p-phenetidine | 70 | 62 |
| 4-n-Hexyloxy-N-cyclohexylaniline | 72 | 68 |
| 4-(2-Ethyl-n-butoxy)-N-cyclohexylaniline | 76 | 77 |
| 4-(2-Ethylhexyloxy)-N-cyclohexylaniline | 81 | 72 |
| 4-n-Octyloxy-N-cyclohexylaniline | 78 | 76 |
| 4-n-Decyloxy-N-cyclohexylaniline | 81 | 77 |
| None | 87 | 79 |

*Example 6*

This example describes the use of one of the substituted anilines in a natural rubber stock, and illustrates the antiozonant properties as distinct from the antioxidant properties of the compounds.

A rubber stock of the following composition was compounded on a laboratory mill:

| | Parts by weight |
|---|---|
| Smoked sheets | 100 |
| Carbon black | 50 |
| Mineral oil based processing agent (Tackol 2) | 3 |
| Zinc oxide | 5 |
| Stearic acid | 3 |
| Sulfur | 2.5 |
| N-cyclohexyl-2-benzothiazolesulfenamide | 0.4 |

The stock was first made up without any other addition as a control stock, and then a stock was made up with the addition of 3 parts by weight of the substance to be tested. Portions of each stock were molded into the shape of a rubber band and vulcanized by heating at 141.5° C. for 30 minutes. The resulting band-shaped test pieces were roughly rectangular, with rounded ends and internal dimensions of 3 inches by ⅝ inch; they were 4 mm. wide and 1 mm thick.

The antiozonant activity imparted to the stocks was measured by means of the test described below.

The basis of the test is the fact that the presence of surface cracks owing to the effect of ozone in a stretched sample of rubber causes a rapid relaxation of the stress present in the sample. The effect as an antiozonant of a substance can therefore be estimated by measuring the rate of stress relaxation of a sample of rubber treated with the substance to be tested. The stress relaxation rates are measured for a series of different linear extensions.

These measurements are made under two different sets of conditions: under static strain, where the sample is subjected to a constant linear extension, and under dynamic strain, where the sample is continually stretched first to a constant linear extension and then released, at a frequency of 60 times per minute.

For the tests under static strain the apparatus employed was essentially that described for measurement of antioxidant activity by Robinson and Vooden in "Industrial and Engineering Chemistry" (1955), vol. 47, page 1477. However, the apparatus was operated at room temperature instead of 110° C., and in an atmosphere of air containing traces of ozone (about 7 parts per million) instead of an atmosphere of air alone.

For the tests under dynamic strain the apparatus was further modified so that the necessary reciprocal motion could be given to one of the two pulleys on which the band-shaped test piece was mounted.

In carrying out a test one of the band-shaped test pieces was extended on the two pulleys of the apparatus by a constant amount and the stress noted that was necessary to maintain this extension. The stress was found to decrease in a logarithmic relationship with time. Measurements were made at different degrees of extension and a graph plotted of rate of stress relaxation against percentage linear extension. These measurements are carried out under both static strain and dynamic strain.

In the present example the necessary measurements under both static and dynamic strain were made for the stock to be tested and the control stock, and graphs drawn comparing the properties of the stock containing the substituted aniline with the control.

For the treated stock there was calculated from the graph the "peak ratio," that is the ratio of the peak rate of stress relaxation for the control stock to the peak rate for the treated stock. The extent to which the figure obtained for this ratio was greater than unity was a measure of the antiozonant value of the compound tested.

The peak ratio values obtained for the substituted aniline tested are given below:

| Substance | Peak Ratio | |
|---|---|---|
| | Static Strain | Dynamic Strain |
| 4-n-Decyloxy-N-cyclohexylaniline | 7.7 | 5.5 |

It can be seen that the figures are well above unity and do in fact represent useful antiozonant activity. The well-established commercial antiozonant 6-ethoxy-2,2,4-trimethyl-1,2-dihydroquinoline (which does however cause discoloration of the rubber) gives an average peak ratio in a similar test of 2.0–2.5.

It is intended to cover all changes and modifications of the examples of the invention herein chosen for purposes of disclosure which do not constitute departures from the spirit and scope of the invention.

This application is a continuation-in-part of application Serial No. 793,288, filed February 16, 1959, now abandoned.

What is claimed is:

1. Sulfur vulcanizable diene rubber in which there is incorporated a small amount within the range of 0.1 to 5 parts by weight per 100 parts by weight of rubber, sufficient to inhibit degradation, of an antidegradant of the structure

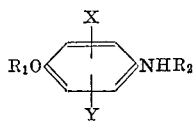

where $R_1$ is a member of a group consisting of benzyl and an alkyl group containing at least 8 carbon atoms but not more than 26, $R_2$ is selected from the group consisting of cyclohexyl and cyclopentyl and X and Y are members of a group consisting of hydrogen and lower alkyl of 1 to 3 carbon atoms.

2. Sulfur vulcanizable diene rubber in which there is incorporated a small amount within the range of 0.1 to 5 parts by weight per 100 parts by weight of rubber, sufficient to inhibit degradation, of an antidegradant of the structure

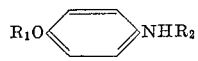

where $R_1$ is an alkyl group of at least 8 carbon atoms but not more than 26 and $R_2$ is cyclohexyl.

3. Sulfur vulcanizable diene rubber in which there is incorporated a small amount within the range of 0.1 to 5 parts by weight per 100 parts by weight of rubber, sufficient to inhibit degradation, of an antidegradant of the structure

where $R_1$ is a branched chain alkyl group of at least 8 carbon atoms but not more than 26 and $R_2$ is cyclohexyl.

4. Sulfur vulcanizable diene rubber in which there is incorporated a small amount within the range of 0.1 to 5 parts by weight per 100 parts by weight of rubber, sufficient to inhibit degradation, of an antidegradant of the structure

where $R_1$ is a benzyl group and $R_2$ is cyclohexyl.

5. Sulfur vulcanizable diene rubber in which there is incorporated a small amount within the range of 0.1 to 5 parts by weight per 100 parts by weight of rubber, sufficient to inhibit degradation, of 4-n-decyloxy-N-cyclohexylaniline.

6. Sulfur vulcanizable diene rubber in which there is incorporated a small amount within the range of 0.1 to 5 parts by weight per 100 parts by weight of rubber, sufficient to inhibit degradation, of 4-decyloxy-N-cyclohexylaniline wherein the aforesaid decyl group is branched.

7. Sulfur vulcanizable diene rubber in which there is incorporated a small amount within the range of 0.1 to 5 parts by weight per 100 parts by weight of rubber, sufficient to inhibit degradation, of 4-benzyloxy-N-cyclohexylaniline.

8. Vulcanized natural rubber having incorporated therein a small amount within the range of 0.1 to 5 parts by weight per 100 parts by weight of rubber, sufficient to inhibit degradation, of an antidegradant of the structure

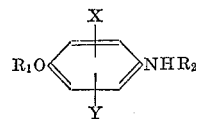

where $R_1$ is a member of a group consisting of benzyl and an alkyl group containing at least 8 carbon atoms but not more than 26, $R_2$ is selected from the group consisting of cyclohexyl and cyclopentyl and X and Y are members of a group consisting of hydrogen and lower alkyl of 1 to 3 carbon atoms.

9. Vulcanized styrene-butadiene copolymer rubber having incorporated therein a small amount within the range of 0.1 to 5 parts by weight per 100 parts by weight of rubber, sufficient to inhibit degradation, of an antidegradant of the structure

where $R_1$ is an alkyl group of at least 8 carbon atoms but not more than 26 than $R_2$ is cyclohexyl.

10. Vulcanized styrene-butadiene copolymer rubber having incorporated therein a small amount within the range of 0.1 to 5 parts by weight per 100 parts by weight of rubber, sufficient to inhibit degradation, of an antidegradant of the structure

where $R_1$ is a branched chain alkyl group of at least 8 carbon atoms but not more than 26 and $R_2$ is cyclohexyl.

11. Vulcanized natural rubber having incorporated therein a small amount within the range of 0.1 to 5 parts by weight per 100 parts by weight of rubber, sufficient to inhibit degradation, of an antidegradant of the structure

where $R_1$ is a benzyl group and $R_2$ is a cycloalkyl group selected from the group consisting of cyclohexyl and cyclopentyl.

12. A compound of the structure

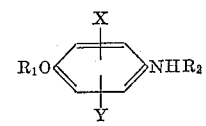

where $R_1$ is a member of the group consisting of benzyl and an alkyl group containing at least 8 carbon atoms but not more than 26, $R_2$ is selected from the group consisting of cyclohexyl and cyclopentyl and X and Y are members of a group consisting of hydrogen and lower alkyl of 1 to 3 carbon atoms.
- 13. 4-n-decyloxy-N-cyclohexylaniline.
- 14. 4-branched chain-decyloxy-N-cyclohexylaniline.
- 15. 4-(2-octyloxy)-N-cyclohexylaniline.
- 16. 4-n-octyloxy-N-cyclohexylaniline.
- 17. 4-(2-ethylhexyloxy)-N-cyclohexylaniline.

References Cited in the file of this patent
UNITED STATES PATENTS

| | | |
|---|---|---|
| 2,166,223 | Semon | July 18, 1939 |
| 2,435,411 | Soday | Feb. 3, 1948 |
| 2,771,368 | Thompson | Nov. 20, 1956 |
| 2,829,121 | Leeper | Apr. 1, 1958 |
| 2,926,155 | Green | Feb. 23, 1960 |